(12) United States Patent
Hutchison et al.

(10) Patent No.: US 10,572,184 B2
(45) Date of Patent: Feb. 25, 2020

(54) GARBAGE COLLECTION IN DATA STORAGE SYSTEMS

(71) Applicant: International Business Machines Corporation, New Orchard Road, NY (US)

(72) Inventors: Gordon Hutchison, Eastleigh (GB); Miles Mulholland, Hampshire (GB); Lee J. Sanders, Chichester (GB); Ben Sasson, North Baddesley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/868,454

(22) Filed: Jan. 11, 2018

(65) Prior Publication Data
US 2019/0212944 A1    Jul. 11, 2019

(51) Int. Cl.
*G06F 3/06*    (2006.01)
(52) U.S. Cl.
CPC ............ *G06F 3/0659* (2013.01); *G06F 3/065* (2013.01); *G06F 3/0608* (2013.01); *G06F 3/0619* (2013.01); *G06F 3/0652* (2013.01); *G06F 3/0653* (2013.01); *G06F 3/0664* (2013.01); *G06F 3/0683* (2013.01)
(58) Field of Classification Search
CPC ....... G06F 3/0659; G06F 3/0608; G06F 3/065
See application file for complete search history.

(56) References Cited

U.S. PATENT DOCUMENTS

| 5,274,807 A | * | 12/1993 | Hoshen et al. | G06F 12/06 395/650 |
| 5,319,766 A | * | 6/1994 | Thaller et al. | G06F 12/08 395/425 |
| 5,381,545 A | * | 1/1995 | Baker et al. | G06F 11/20 395/575 |
| 5,671,390 A | * | 9/1997 | Brady et al. | G06F 17/30 395/440 |

(Continued)

OTHER PUBLICATIONS

Mell et al. "The NIST Definition of Cloud Computing Recommendations of the National Institute of Standards and Technology". NIST Special Publication 800-145. National Institute of Standards and Technology. U.S. Department of Commerce. Sep. 2011. Gaithersburg, MD.

(Continued)

*Primary Examiner* — Ann J Lo
*Assistant Examiner* — Michelle T Bechtold
(74) *Attorney, Agent, or Firm* — Edward P. Li

(57) ABSTRACT

A method and a computer system for maintaining synchronization between primary data stored in a primary volume and secondary data stored in a secondary volume. The primary volume and the secondary volume having respective address spaces divided into address blocks, each comprising a range of addresses. The computer system determines a start condition in which the secondary data has been checked as being a mirror of the primary data, transmits writes of the primary data that have occurred since the start condition to the secondary volume, and maintains an incremental record of current differences between the primary (Continued)

and secondary volumes on a per address block basis. The computer system operates a garbage collection algorithm on the secondary volume to clean up the address space.

14 Claims, 11 Drawing Sheets

(56) References Cited

U.S. PATENT DOCUMENTS

| | | | | |
|---|---|---|---|---|
| 6,128,630 | A * | 10/2000 | Shackelford | G06F 17/30 707/204 |
| 6,151,666 | A * | 11/2000 | Blendermann et al. | G06F 12/00 711/170 |
| 6,219,676 | B1 * | 4/2001 | Reiner | G06F 17/30 17/30 |
| 6,625,623 | B1 * | 9/2003 | Midgley et al. | G06F 17/30 707/204 |
| 7,386,695 | B2 | 6/2008 | Fuente | |
| 8,346,727 | B1 * | 1/2013 | Chester et al. | G06F 7/00 707/640 |
| 8,688,937 | B2 | 4/2014 | Agombar et al. | |
| 8,793,453 | B2 | 7/2014 | Agombar et al. | |
| 8,868,860 | B2 | 10/2014 | Beeken | |
| 8,990,162 | B1 * | 3/2015 | Kushwah et al. | G06F 17/30088 707/646 |
| 8,990,164 | B1 * | 3/2015 | Mahajan et al. | G06F 11/1451 707/649 |
| 9,152,638 | B1 * | 10/2015 | Naftel | G06F 17/3007 |
| 9,164,886 | B1 | 10/2015 | Phan | |
| 9,235,535 | B1 * | 1/2016 | Shim et al. | G06F 12/16 |
| 9,417,999 | B2 | 8/2016 | Benhase et al. | |
| 9,424,137 | B1 * | 8/2016 | Mam | G06F 11/1451 |
| 9,430,376 | B2 | 8/2016 | Horn | |
| 9,465,733 | B2 | 10/2016 | Lee et al. | |
| 9,472,222 | B2 | 10/2016 | Aguilar | |
| 9,495,435 | B2 | 11/2016 | Zhang et al. | |
| 9,501,393 | B2 | 11/2016 | Chen et al. | |
| 9,690,666 | B1 * | 6/2017 | Shembavnekar et al. | G06F 11/1451 |
| 9,817,582 | B2 | 11/2017 | Green | |
| 2002/0116404 | A1 * | 8/2002 | Cha et al. | G06F 17/30 707/202 |
| 2006/0200639 | A1 * | 9/2006 | Levy et al. | G06F 12/16 711/162 |
| 2007/0088912 | A1 * | 4/2007 | Mukherjee et al. | G06F 12/00 711/112 |
| 2010/0049930 | A1 * | 2/2010 | Pershin et al. | G06F 12/16 711/162 |
| 2010/0228913 | A1 * | 9/2010 | Czezatke et al. | G06F 12/16 711/112 |
| 2010/0332780 | A1 * | 12/2010 | Furuya | G06F 12/16 711/162 |
| 2013/0339298 | A1 * | 12/2013 | Muller et al. | G06F 11/1448 707/640 |
| 2013/0339587 | A1 * | 12/2013 | Asnaashari et al. | G06F 12/0246 711/103 |
| 2014/0181432 | A1 * | 6/2014 | Horn | G06F 12/0253 711/159 |
| 2014/0236892 | A1 * | 8/2014 | Blyler et al. | G06F 17/03 |
| 2014/0344216 | A1 | 11/2014 | Abercrombie et al. | |
| 2015/0347025 | A1 * | 12/2015 | Law | G06F 3/0611 |
| 2016/0077920 | A1 * | 3/2016 | Regni et al. | G06F 11/1451 |
| 2016/0371190 | A1 | 12/2016 | Romanovskiy | |
| 2017/0123972 | A1 * | 5/2017 | Gopinath et al. | G06F 12/0253 |
| 2018/0210675 | A1 * | 7/2018 | Tang et al. | G06F 3/0652 |
| 2018/0239676 | A1 * | 8/2018 | Glebe et al. | G06F 11/1469 |

OTHER PUBLICATIONS

"Hitachi Accelerated Flash an Innovative Approach to Solid-State Storage". Feb. 2016. Hitachi Data Systems. Santa Clara, CA. WP-470-G HDS.

* cited by examiner

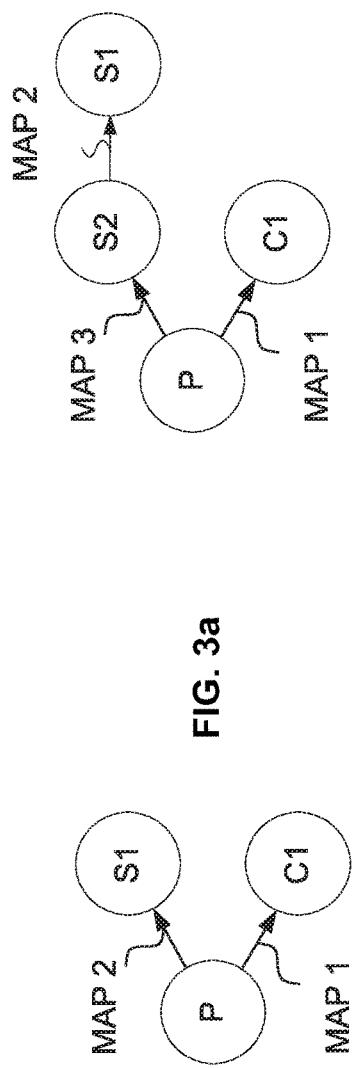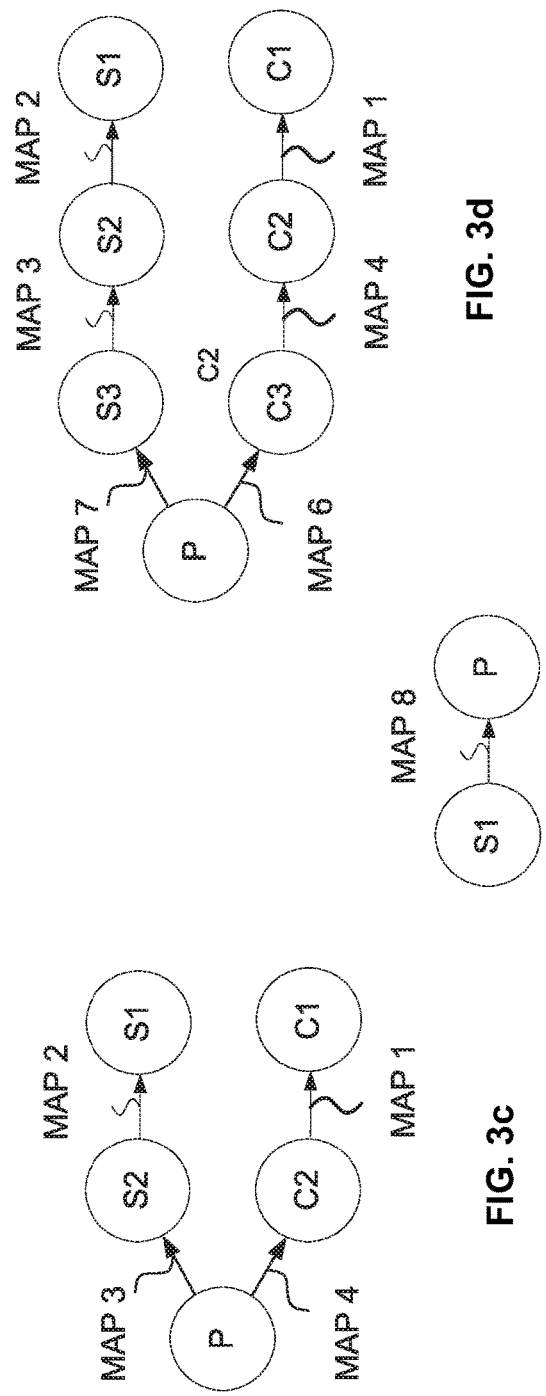
FIG. 3a
FIG. 3b
FIG. 3c
FIG. 3d
FIG. 3e

GARBAGE COLLECTION IN DATA STORAGE SYSTEMS

BACKGROUND

The present invention relates generally to garbage collection in a data storage system, and more particularly to garbage collection in the context of backups such as mirroring and taking point-in-time copies.

Garbage collection is used in data storage systems as a background memory management function which cleans up a physical storage medium by making contiguous blocks of address space available for future write operations. This is typically done by deleting no-longer needed data and by grouping smaller blocks of still-needed data into larger contiguous blocks of address space to defragment use of the storage medium in a process called coalescing or compaction.

Within storage controllers, it is known to provide a replication function which backs up local data in a non-disruptive way to another set of local storage devices by using mirroring or point-in-time copies. Another form of replication is to backup the data to a remote site.

Terminology in the art refers to a primary site and a secondary site for data storage, where the primary site is where the original or master copy is located and the secondary site is where the backup copy is located. Terminology in the art also refers to a source volume and a target volume, where data is transferred from the source to the target when performing a backup or mirroring operation. The term destination volume is a synonym for target volume.

For example, storage controllers with a replication function are the IBM SAN Volume Controller or Storage RAID arrays such as the IBM Storwize® products. For example, the mirroring or point-in-time copy technology is IBM FlashCopy® and IBM Global Mirror with Change Volumes (GMCV). For example, the remote site data backup technology is IBM HyperSwap®, Global Mirror® or Metro Mirror®. IBM® is a reference to International Business Machines Corporation of Armonk, N.Y.

FlashCopy® implements a bitmap to track differences between the source and target volumes that are related by FlashCopy®. The bitmap records per address space unit, referred to as a grain, whether the data stored on the source is also stored on the target. That is there is one bit in the bitmap for each grain. At an initial point in time, after full replication has taken place, all bits in the bitmap are unset, or "not split", indicating that the two volumes are identical copies of each other. As the storage system evolves, certain grains in the source may diverge from those of the target, e.g., as a result of a host write to one or the other volume, and the bits for those grains are set in the bitmap. Those grains are said to be "split". Reads and writes to the storage system can then refer to the bitmap to determine whether to read from the source or target volume, or in the case of a write whether a grain update in respect of an unsplit grain needs to be performed before the write can take place. Two types of bitmap are maintained. There is the bitmap just discussed which relates to the split, this split bitmap being a bitmap of grains that have been copied already to the target. There is additionally a bitmap relating to the differences or increments, which is called the difference bitmap or incremental bitmap. This is the bitmap of grains that have changed on the source since the initial trigger, so in subsequent re-triggers then the copy process only needs to copy these grains instead of running a full copy again. It is additionally noted that, as an alternative to "grain" terminology, we may refer to the units of address space as "address blocks" or just "blocks".

GMCV uses FlashCopy® internally to guarantee the consistent copy, but offers a tunable recovery point objective (RPO), called a cycling period. With GMCV, a FlashCopy® mapping, called a change volume, exists on both the source and target. When replication begins, all data is sent from the source to the target, and then changes are tracked on the source change volume. At the end of each cycle period, the changes accumulated in the source change volume are sent to the target change volume, which then stores that set of data as a consistent copy.

Replication may be taking place on storage volumes that use thin provisioning. Thin provisioning is a virtualization scheme whereby a volume appears the size a user would like it to be from an applications perspective, but in which the amount of physical storage used at the back end is only sufficient to store the data actually contained on the volume from the host. Blocks of data on the physical storage medium are allocated as needed, rather than in advance during formatting. This optimizes resources used and allows the unutilized storage to be used for other purposes. Thin provisioning may be used on either the source data or the copy of the data, or both.

De-duplication is another technology that is becoming increasingly common. De-duplication allows the system to identify as data is written whether the same data is already present elsewhere, and, instead of storing a new copy of the data, adds a reference to the source data instead of processing the write. The benefit is greatly reduced cost and utilization, and the user can use the saved space for other purposes.

Compression is another technology often used also to reduce storage requirements in which data stored in an original representation is converted into another representation which requires less memory. Compression can be used independently of, i.e., alongside, thin provisioning and de-duplication.

The data stored at the local and remote sites may use any of these technologies. Commonly, for fast access, the primary site may choose not to use these technologies due to the additional overhead of maintaining metadata to manage the compressed and/or de-duplicated data.

With compression, over-writes to previously written data are often written elsewhere, since at the time of the write, the compressed user data may have changed in size and therefore the controller doesn't know the size of the old data. This requires garbage collection technologies to reclaim the space occupied by previous versions of the data. Additionally, if the region of the physical storage is fragmented, then the garbage collection also needs to coalesce (or compact) the current data to another location to allow larger areas of the physical space to become free, thereby minimizing fragmentation of the backend physical space.

Often de-duplication operates at a much wider level than at a user volume level. Often it is a system wide, or storage pool level which means the metadata and algorithms that are used have to operate at a wider level and many user volumes need to be included within the scope of the de-duplication. For de-duplication, garbage collection is required for different reasons. Depending on the implementation, multiple user volumes may be referencing the same piece of physical data on the backend. If an over-write occurs on the source of the user data, the new write has to be written elsewhere. Additionally, the controller often choses to implement de-duplication together with thin-provisioning, coalescing smaller chunks of sparsely populated user data into larger chunks of data, therefore over time fragmentation will mean that garbage collection needs to gather together smaller chunks into larger chunks which each need a commensurately large chunk of free space for their storage. Since de-duplication occurs across multiple user volumes, the Garbage Collection also has to operate at the same level (such as storage pools) to be effective. Storage pools often maintain slack-space in case there is a sudden workload of new write data, since delaying user I/O while waiting for garbage collection to free up space for the new write is undesirable. Garbage collection operations thus have the task of compacting data from small writes into larger chunks, thereby to free-up larger contiguous blocks of physical storage.

I/O may be communication from host site to remote site (or source to target volume) that is connected with updating writes and other activities including garbage collection. I/O also includes communication between a disk controller and the disk, e.g., the communications between the disk controller of the target volume and the target volume to carry out garbage collection or updating writes.

An I/O can be a read operation or a write operation. The operation can be, for example, from the host to the storage controller, or from the storage controller to the backend drive. In the case of a read operation/request from host to the controller, data is transferred from the storage controller back to the host. In the case of a write operation/request, data is transferred from the host to the storage controller, since the host is requesting that it wants to send data and store it on the storage controller. A user I/O is an application operation and a host I/O is a host operation. Other I/O types may originate from the storage controller itself, such as a garbage collection request. A cleaning I/O is a FlashCopy® term applicable to IBM SAN volume controllers. Cleaning is a process of making the target copy independent of the source volume which is effected by copying the dependent data from the source to the target. This involves reading the dependent data from the source and writing it to the target. Therefore, these I/O operations are generated internal to the storage controller.

User volumes have a forward lookup tree that maps the user volume to physical storage. Data replication of a volume operates at a user volume level, where the data is stored within the same storage pool. A storage pool encompasses many user volumes over which a joint garbage collection operation is being performed. In order for a garbage collection algorithm to work efficiently it is preferable to scan the storage at a physical level, rather than at a user's virtualized volume level. This means that garbage collection works from the other end compared with the user. A reverse lookup algorithm is therefore needed to translate the physical data movements caused by the garbage collection algorithm into the virtualized space that the user forward lookup mechanism is referring to. Garbage collection operations thus also have this task of manipulating the forward lookup tree.

Generally, a storage system has to balance the user I/O workload with garbage collection scheduling rates to avoid overloading the physical storage, otherwise the performance of the user I/O will degrade.

When a volume copy is triggered using either of the replication technologies (mirroring or point-in-time copying), the target volume is likely to receive a bunch of over-writes for the previously written data to those areas on the target.

SUMMARY

In one aspect, a method for maintaining synchronization between primary data stored in a primary volume and secondary data stored in a secondary volume is provided. The primary volume and the secondary volume having respective address spaces divided into address blocks, each comprising a range of addresses. The method comprises determining a start condition in which the secondary data has been checked as being a mirror of the primary data; transmitting writes of the primary data that have occurred since the start condition to the secondary volume; maintaining an incremental record of current differences between the primary and secondary volumes on a per address block basis to keep track of imminent writes from the primary volume which have not yet been transmitted to the secondary volume; and operating a garbage collection algorithm on the secondary volume to clean up the address space by identifying address blocks storing no-longer-current secondary data and noting those address blocks as available for writes, wherein the garbage collection algorithm refers to the incremental record to find the imminent writes to the secondary volume.

In another aspect, a computer system for maintaining synchronization between primary data stored in a primary volume and secondary data stored in a secondary volume is provided. The primary volume and the secondary volume having respective address spaces divided into address blocks, each comprising a range of addresses. The computer system comprises one or more processors, one or more computer readable tangible storage devices, and program instructions stored on at least one of the one or more computer readable tangible storage devices for execution by at least one of the one or more processors. The program instructions are executable to determine a start condition in which the secondary data has been checked as being a mirror of the primary data. The program instructions are further executable to transmit writes of the primary data that have occurred since the start condition to the secondary volume. The program instructions are further executable to maintain an incremental record of current differences between the primary and secondary volumes on a per address block basis to keep track of imminent writes from the primary volume which have not yet been transmitted to the secondary volume. The program instructions are further executable to operate a garbage collection algorithm on the secondary volume to clean up the address space by identifying address blocks storing no-longer-current secondary data and noting those address blocks as available for writes, wherein the garbage collection algorithm refers to the incremental record to find the imminent writes to the secondary volume.

BRIEF DESCRIPTION OF THE SEVERAL VIEWS OF THE DRAWINGS

FIG. 3a-FIG. 3e depict point-in-time copy mappings, in accordance with one embodiment of the present invention.

DETAILED DESCRIPTION

Figure 1:
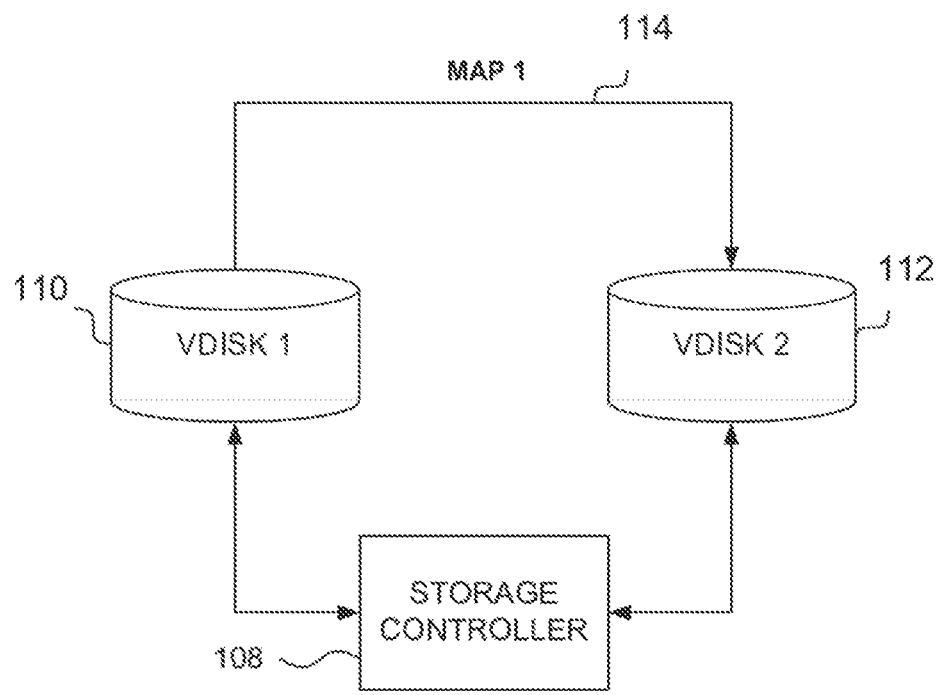
FIG. 1 depicts a backup process using a storage controller and two storage disks, in accordance with one embodiment of the present invention.

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

In the present disclosure, we consider the task of maintaining synchronization between primary data stored in a primary volume and secondary data stored in a secondary volume. The primary and secondary volumes have respective address spaces divided into address blocks, each comprising a range of addresses.

For maintaining synchronization, we propose using information already retained by the storage system for the purposes of backup services, such as FlashCopy®, Remote Copy, Metro Mirror®, Global Mirror®, and Global Mirror Change Volumes (GMCV), as an aid to the garbage collection service being applied to the target volume. We consider a storage system in which incremental changes to the source volume since the last trigger are retained. By trigger, we mean a trigger from the last point in time when there was verified, full synchronization between the source and target volumes.

We propose that the record of the incremental changes is made available to the target volume's garbage collection service for it to use as a guide for its operations. The incremental record is useful for the garbage collection service on the target volume, since it indicates where overwrites are most likely about to occur in order to re-synchronize the volumes. The incremental record can therefore be used by the storage controller of the target volume as part of its garbage collection activity, for example to prioritize the areas where over-writes are most likely about to occur for garbage collection. In practice, the controller's scheduler can consider all address blocks on the target volume that are pointed to in the incremental record for imminent update, and then deduce one or more larger, contiguous address space regions covering these address blocks, which can then be prioritized for clean-up. Here it is noted that although the target volume is likely to be virtualized, the garbage collection service is most efficient when run on physical addresses, with a lookup record being retained for mapping between the physical and virtual addresses.

In certain embodiments, the garbage collection algorithm refers to the incremental record in decision making on which regions of the secondary volume's address space to select for clean-up.

In certain embodiments, the garbage collection algorithm is further operable to clean up the secondary volume by moving current address blocks to reduce fragmentation. In particular, the garbage collection algorithm may refer to the incremental record when selecting which of the current address blocks to move, so as to de-prioritize selecting address blocks, for which the incremental record indicates the corresponding address blocks on the primary volume are different. Moreover, the garbage collection algorithm, when selecting address blocks for moving, may refer to the incremental record to identify contiguous sequences of address blocks which have been changed on the primary volume and not yet replicated on the secondary volume. Specifically, when selecting address blocks for moving, the garbage collection algorithm may identify at least first and second ones of said contiguous sequences of address blocks and select said at least first and second ones for moving together when said at least first and second ones are separated only by a small gap in the address space. By a small gap, this may be a gap of at least one of the group selected from: 1, 2, 3, 4, 5, 6, 7, 8, 9 and 10 address blocks, i.e., a gap which is small in an absolute sense, or may be a gap which is small in a relative sense defined as a percentage of the total number of address blocks, e.g., less than 10% of a number of address blocks which is the lower of the number of address blocks in the first sequence and the second sequence.

In certain embodiments, the garbage collection algorithm refers to the incremental record to assess what regions of address space will be required on the secondary volume by the imminent writes, and temporarily suspends its garbage collection operations conditional on the secondary volume currently having sufficient available address space to accommodate the imminent writes.

In certain embodiments, the garbage collection algorithm is configured to operate based on physical addresses of the secondary volume. At least one of the primary and secondary volumes may operate also on virtualized addresses, and a lookup record is maintained to map physical to virtual addresses on a per address block basis.

When a point-in-time copy operation is initiated, a point-in-time relationship is created between the source volume and the target volume. Thus, a point-in-time relationship is a mapping of the point-in-time source volume and the point-in-time target volume. This mapping allows a point-in-time copy of the source volume to be copied to the associated target volume. The point-in-time relationship exists between this volume pair from the time that a point-in-time operation is initiated until the storage unit copies all data from the source volume to the target volume or until the point-in-time relationship is deleted. Moreover, a cascaded point-in-time configuration is one where the source disk of one map is the target disk of another map. For example, there may be one map defined with source disk A and target disk B, and another map defined with source disk B and target disk C. The cascade includes the three disks A, B, and C and the two maps. Once the copies are made, the copies are immediately available for both read and write access.

When the data is physically copied, a background process copies tracks or grains from the source volume to the target volume.

When a point-in-time operation copies data from a source volume to a target volume, the source volume can be involved in more than one point-in-time relationship at the same time (known as a multiple relationship point-in-time). That is, the multiple relationship point-in-time function allows a source volume to have multiple targets simultaneously. If a track on a volume is not a target track of an existing point-in-time relationship, it can become the target in a new point-in-time relationship.

For example, if multiple copies of the same data are required, this multiple relationship point-in-time function allows a single source volume to be copied multiple times to different target volumes as soon as a point-in-time volume is established. For example, a point-in-time is used to copy volume A to volume B. As soon as that point-in-time relationship is established, volume A may be copied to volume C. Once that relationship is established, volume A may be copied to volume D, and so on. Additionally, multiple sessions within a single volume are possible.

A cascade may be used to implement multiple point-in-time copies of a single data source. For example, with a data source P and point-in-time copies of P taken at times t1, t2 and t3; at time t1, there is taken a point-in-time copy using data target T1 resulting in a cascade: P→T1; at time t2, there is taken a second point-in-time copy using data target T2 and resulting in the cascade: P→T2→T1. In effect, T1 is established as a copy of T2, which is at this instant identical with P, and T2 is a copy of P. A bitmap held by T2 that describes its differences from P also correctly describes its difference from T1. Updates to P only require a copy operation to copy from P to T2. Conversely, updates to T2 require two copy operations: from P to T2 and from T2 to T1. This is because updates to the middle of a chain force a copy to the relationships on either side. Adding a third backup T3 at t3 produces the cascade: P→T3→T2→T1.

This technique has many benefits. However, it also introduces dependencies between the data targets that may not exist in a traditional multiple target implementation. A side effect of this target dependency can be a requirement to "clean" a target when a point-in-time copy is stopped or completes. For example, if point-in-time copy P→T2 is stopped, any data on T2 that is required by T1 is typically copied from T2 to T1 before the target T2 can be removed from the cascade. In many situations, this is not a problem, because the user may wish T1 to hold a complete copy of P at time t1, meaning that the backup process P→T1 is a clone. However, if the intention of P→T1 is just to produce a snapshot of P at time t1, this extra copying from T2 to T1 may cause the user problems. Further, if the data target T1 is thinly provisioned (also known as space efficient), the problems caused by the above behavior may cause the unnecessary allocation of storage to T1. In some applications, this may reduce the user's ability to maintain snapshots and clones and to manage their backups.

FIG. 1 depicts a backup process using a storage controller 108 and two storage disks 110 (vdisk1) and 112 (vdisk2), in accordance with one embodiment of the present invention. The disks 110 and 112 can form part of a larger array of disks, and may form part of an enterprise storage solution. The disks 110 and 112 can be part of a storage solution relating to a commercial website, for example. If at any time a backup needs to be made of the content of disks 110, then a point-in-time copy instruction can be sent from the storage volume controller 108 to the disk 110, which defines a source disk 110 and also the target disk 112, which is the target of the point-in-time copy. The point-in-time copy instruction creates a point-in-time copy of the image of the specific vdisk which is the source disk 110.

Referring to FIG. 1, the source disk 110 of a first point-in-time copy instruction is vdisk1 110, and the target disk 112 is vdisk2 112. The point-in-time copy instruction starts the point-in-time copy process, which creates a map 114 from the source disk 110 to the target disk 112. This map is labelled MAP 1 in FIG. 1. The image of vdisk1 at this specific point in time is now available on vdisk2. This creates a backup of the data on vdisk1 and also allows tests and other administration tasks to be run on the data of vdisk1, without the attendant danger of losing any of the original data, as it is preserved on the original source disk.

When a point-in-time copy is made, it creates a link between the two disks 110 and 112, as defined by the map 114. Data may now be copied across in the background, with the additional requirement that any access to vdisk2 (as the target disk 112) may immediately cause the relevant parts of the image of vdisk1 to be copied across, and also any access to vdisk1 which results in a change to the image stored by that disk 110 will also cause the unaltered data to be immediately copied across to the target disk 112, prior to the change being made. In this way, the vdisk2, to an outside user, stores the point-in-time copy of vdisk1, although data may only be physically copied across under the circumstances described above.

A storage volume that is the target volume of a backup process such as a point-in-time copy function can also be the source volume of a further backup process, thus creating a cascade of storage volumes.

Figure 2:
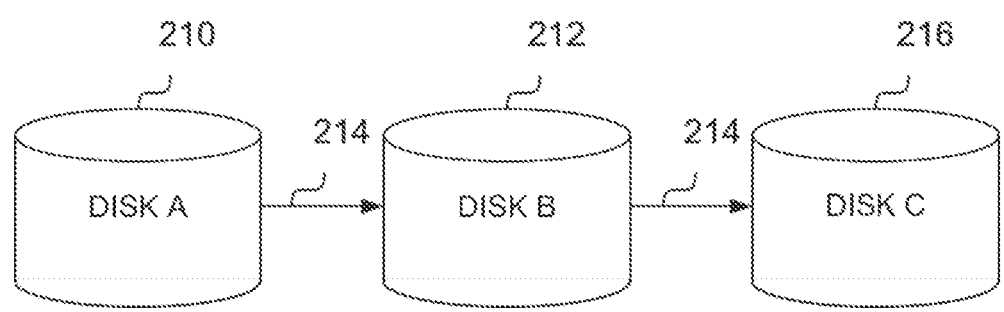
FIG. 2 depicts an example of a point-in-time copy cascade of three storage volumes, which are linked by point-in-time copy maps, in accordance with one embodiment of the present invention.

FIG. 2 depicts an example of a point-in-time copy cascade of three storage volumes 210, 212, and 216, which are linked by point-in-time copy maps 214, in accordance with one embodiment of the present invention. Each of maps 214 defines a backup process from a source volume to a target volume. Disk B provides a backup of disk A 210, and disk C 216 also provides a backup of disk A 210, through disk B 212. The point-in-time copy functions linking the different storage volumes may have been started at different times, which create different point-in-time copies of the images stored by the respective storage volumes, or can be started simultaneously.

In the point-in-time copy cascade of A→B→C, where A 210, B 212, and C 216 are the disks in the cascade, as shown in FIG. 2, and the arrows are the point-in-time copy maps 214, then denoting (A, B) to be a point-in-time copy mapping from disk A 210 to disk B 212, the cascade has maps (A, B) and (B, C). In this implementation of the cascade, any new data write to disk A 210 will cause a write, that is a "copy write", to disk B 212, as per the respective point-in-time copy function, which is required to maintain the image on disk B 212. This writing to disk B 212 will cause a further read, often referred to as a "clean read" of disk B 212 followed by another copy write to disk C 216. In this way, a single write to the first storage volume 210 in the cascade can result in a number of I/O cleaning operations throughout the cascade.

When a cascade is created, the new maps and new storage volumes are inserted into the cascade, not added to the end of the cascade. In the cascade shown in FIG. 2, the first backup process started is A4C. When the backup process A4B is then started, the new target storage volume B 212 is effectively inserted between the existing source storage volume A 210 and the existing target storage volume C 216. This insertion is purely a logical construction illustrating the fact that target disk C 216 will receive data writes from disk B 212, rather than disk A 210. This is how a cascaded implementation differs from a conventional arrangement which have two independent maps from disk A 210.

The storage controller 108 may be operated so that the disks and maps are arranged so that clones and snapshots are separated into different dependency chains or cascades. As described in greater detail below, one feature of separating clones and snapshots into different cascades is to reduce or eliminate cleaning operations caused by termination of a copying operation.

FIG. 3*a*-FIG. 3*e* depict point-in-time copy mappings, in accordance with one embodiment of the present invention. For example, within the context of the present description, Map 1 of FIG. 3*a* is started as a clone and later Map 2 is started as a snapshot. The resulting graph structure for the source volume P, the clone volume C1, and the snapshot volume S1, and used to maintain the target images, will be as depicted in FIG. 3*a*. This structure is a dependency graph.

In the graph shown in FIG. 3*a*, a data write to disk P may require copy-on-writes to C1 and/or S1 in order to maintain those images on the target disks of the respective backup processes. If the storage volume controller 108 starts Map 3, as a snapshot, the resulting dependency graph is as depicted in FIG. 3*b*. In a cascade, the new disk and map to that disk may be placed adjacent to the source disk P, so the new target disk S2 of Map 3 is placed in cascade P→S2→S1, where the two maps, Map 3 and Map 2, are both snapshots. In the separate cascade P→C1 Map 1 is a clone.

Subsequent backup processes as either snapshots or clones of P extend the length of the clone and/or snapshot chains without increasing the number of edges leaving P and so do not increase the number of cleaning operation I/O's associated with a write to P. The graph of FIG. 3*b* can be extended to include further snapshots and clones. To maintain cascade type separation, if a cascade exists for the specific backup process type (clone or snapshot), then the target storage volume is added to the existing cascade for the identified backup process type, or if a cascade does not exist for the identified backup process type, then a new cascade is started, which consists of the target storage volume and the source storage volume. In this way, clones and snapshots taken from specific source disks do not appear in the same cascade from that specific source disk.

FIG. 3*c* depicts the logical arrangement of the storage volumes after further backup C2 has been taken. If the storage volume controller 108 starts Map 4 as a clone, the resulting dependency graph is as depicted in FIG. 3*c*. In a cascade, the new disk and map to that disk are placed adjacent to the source disk P, so the new target disk C2 of Map 4 is placed in cascade P→C2→C1, where the two maps, Map 4 and Map 1, are both clones. In the separate cascade P→S2→S1, the two maps, Map 3 and Map 2, are both snapshots.

FIG. 3*d* depicts the logical arrangement of the storage volumes after further clone and snapshot backups C3 and S3 have been taken. The storage volume controller 108 starts Map 6 as a clone and Map 7 as a snapshot, the resulting dependency graph is as depicted in FIG. 3*d*. In a cascade, the new disk and map to that disk are placed adjacent to the source disk P, so the new target disk C3 of Map 6 is placed in cascade P→C3→C2→C1, where the three maps, Map 6, Map 4, and Map 1, are each clones. The new target disk S3 of Map 7 is placed in cascade P→S3→S2→S1, where the three maps Map 7, Map 3, and Map 2 are each snapshots.

The order in which the different types are taken can be any permutation of S1, S2, S3, C1, C2, and C3, provided the snapshots are in the correct order relative to the other snapshots and the clones are in the correct order relative to other clones. For example, the start order can be S1, C1, S2, S3, C2, and C3. These cascades can be considered as forming a tree with root node P as shown in FIG. 3*d*.

As per the respective point-in-time copy function with multiple target point-in-time copies, writes to a disk in a dependency graph results in a read, split writes and a client write to maintain the other images on the disks. For example, a client (or host) write to P in the above dependency graph may result in: (1) a read, that is, a read of P, if the data is required by S3 or C3 for the location being written to is on P, (2) a split write, that is: (a) a write to S3 of the data read from P, if S3 is dependent on P, and (b) a write to C3 of the data read from P, if C3 is dependent on P (which can be performed in parallel to the second action), and (3) a client write, that is, the client write itself to P. As a result of these cleaning operations for each write to P, the volumes S3 and C3 are each independent of any grains changed since those backups are started.

One feature of separating clones and snapshots into different cascades is to facilitate termination of unnecessary backups to reduce or eliminate cleaning associated with the stop itself. For example, if Map 4 is stopped in the dependency graph of FIG. 3*d*, the storage volume controller 108 will clean the data from C3 to C1. This may not be considered to be an added cleaning operation because C1 is also a clone and the data is intended to be copied onto it. The snapshots S3, S2, S1 are not affected.

Conversely, when a snapshot is stopped, all snapshots and clones of the target snapshot disk may be readily stopped due to the separation from the clone cascades without additional cleaning resulting from the stop. Furthermore, when a clone is stopped all snapshots of the target clone disk may also be stopped. This approach may be taken because a snapshot is typically dependent on its source. Consequently, if the clone source of a snapshot is destroyed, the dependent snapshot is likely of little or no use. In this manner, by separating clones and snapshots into different cascades, additional cleaning operations can be reduced or eliminated.

If it is now discovered, for example, that disk P is corrupt and the administrator wishes to restore disk P from an existing disk such as disk S 1; for example, there is created and started a Map 8, S1→P, which results in cascade S1→P (FIG. 3*e*). Using a separate cascade for the restore operation results in three separate cascades. For instance, restoring P from S1 results in cascades P→S3→S2→S1 and P→C3→C2→C1 (FIG. 3*d*) and S1→P (FIG. 3*e*). Restoration of disk P is described below with reference to FIGS. 4, 5*a*, 5*b*, 5*c*, and 5*d*.

The system also allows a disk to exist a number of times in the same cascade or in separate cascades. As an example, S3, S2 and S1 are created as snapshots of P. S1 contains the user's original data, whereas S3 and S2 contain further snapshots on which two different simulations have been run. The user may decide that the result of the simulation on S2 is beneficial and decides to restore P from S2. The system allows for the user to start a new map S2→P while still maintaining the unmodified backup of the original data in S1.

However, the more times that a disk appears in a cascade the more I/O operations may be required at the point-in-time copy level (cleaning I/O's) before a host originated I/O can be completed back to the host. Alternatively, to reverse a map, an administrator can simply create and start a map 214 in the opposite direction.

Figure 4:
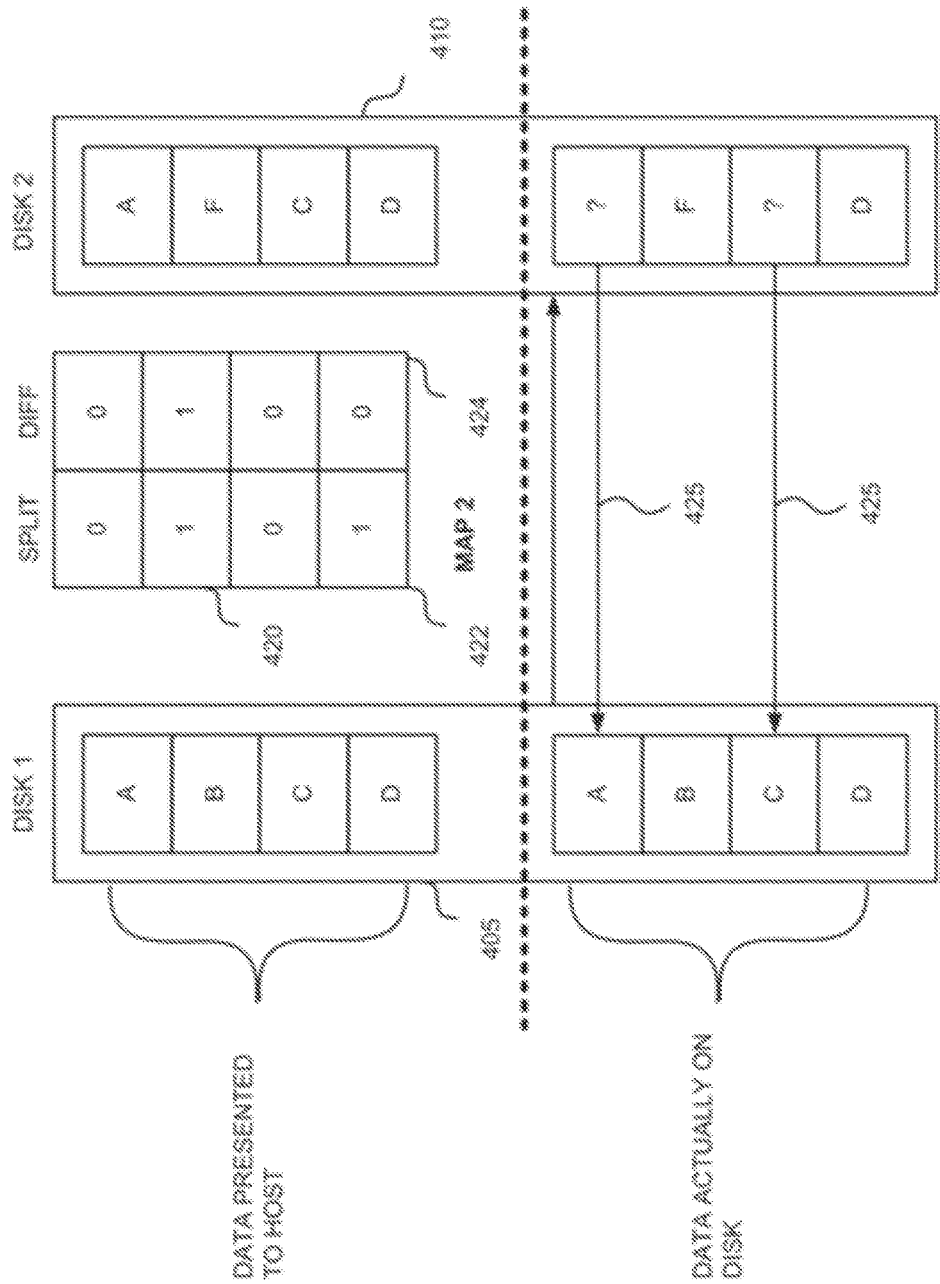
FIG. 4 depicts an exemplary cascade of a map, in accordance with one embodiment of the present invention.

FIG. 4 depicts an exemplary cascade of a map, in accordance with one embodiment of the present invention. More specifically, FIG. 4 depicts representations of two disks 405 and 410. As depicted in FIG. 4, the upper portions of the disks indicate data that is presented to, e.g., a host, from the respective disks. The disk as presented to a host is referred to as the vdisk. A vdisk is a term used in storage virtualization to signify a virtual logical disk or volume with which a host computer or host computer application performs I/O operations. FIG. 4 also depicts the lower portions of the representations of the disks indicating the data that is actually contained on the respective disks. These lower portions of the disk are referred to as a pdisk. The pdisk is an object that is directly connected to physical storage. The skilled person would understand that the pdisk may itself be a virtual volume sitting on a Redundant Array of Independent Disks (RAID) array(s). The skilled person would also appreciate that the storage controller 108 manages the copies at a virtual level, but that reads and writes to logical disks do result in reads and writes, respectively, to physical disks. Thus, Disk 405 presents four grains (or tracks) of data A, B, C, D to a user and actually has those grains A, B, C, D stored on Disk 405. In contrast, Disk 410 presents four grains of data A, F, C, D to a user. However, as shown in the bottom portion of Disk 410, Disk 410 actually only has stored thereon grains two and four (F and D, respectively) and relies upon data stored in Disk 405 to present the host with grains A and C. The fourth grain (D) is stored on Disk 410, even though the same data is available on Disk 405, for example, a rewrite of data D onto Disk 405 previously.

As additionally depicted in FIG. 4, Map 420 is an incremental map between Disk 405 and Disk 410. That is, Map 420 includes a split bitmap (split) 422 and a difference bitmap (diff) 424. The split bitmap 422 is used in a point-in-time process to track the location of the data. More specifically, a "0" in the split bitmap 422 indicates that the data is located on the source disk and a "1" in the split bitmap 422 indicates that the data is located on the target disk. Furthermore, the difference bitmap 424 is used in a point-in-time copy process to track the differences between the source and target disks, e.g., virtual disks. More specifically, a "0" in the difference bitmap 424 indicates there is no difference between the data located on the source disk and the target disk, and a "1" in the difference bitmap 424 indicates that there is a difference between the data located on the source disk and the data located on the target disk.

Thus, referring to the example of FIG. 4, the split bitmap 422 of Map 420 indicates that grains A and C are located on the source disk (Disk 405) and grains F and D are located on the target disk (Disk 410). Moreover, the difference bitmap 424 of Map 420 indicates that there is no difference between the first, third and fourth grain of the source disk (disk one 405) and the target disk (disk two 410). That is, the first, third, and fourth grain remain the same between the source disk and the target disk, i.e., A, C and D, respectively. However, the difference bitmap 424 of Map 420 indicates that there is a difference for the second grain between the source disk (Disk 405) and the target disk (Disk 410). That is, as shown in FIG. 4, the second grain has been changed from B on Disk 405 to F on Disk 410. Thus, pointers 425 illustrate that the target disk 410 refers to the source disk 405 based on the contents of the split bitmap 420 rather than to the physical contents of Disk 410. Advantageously, according to the prior art, the use of bitmaps 422 and 424 allows the storage controller 108 to manage access to virtual and physical copies of storage disk volumes, including management of the data content when copies are added or deleted from the system. When a copy is deleted from the chain, the contents representing data updates can be cleaned onto another copy in the remaining chain, based on the contents of the bitmaps 422 and 424.

FIG. 5a-FIG. 5d depict a method for recovering from a disk corruption, in accordance with one embodiment of the present invention.

Figure 5B:
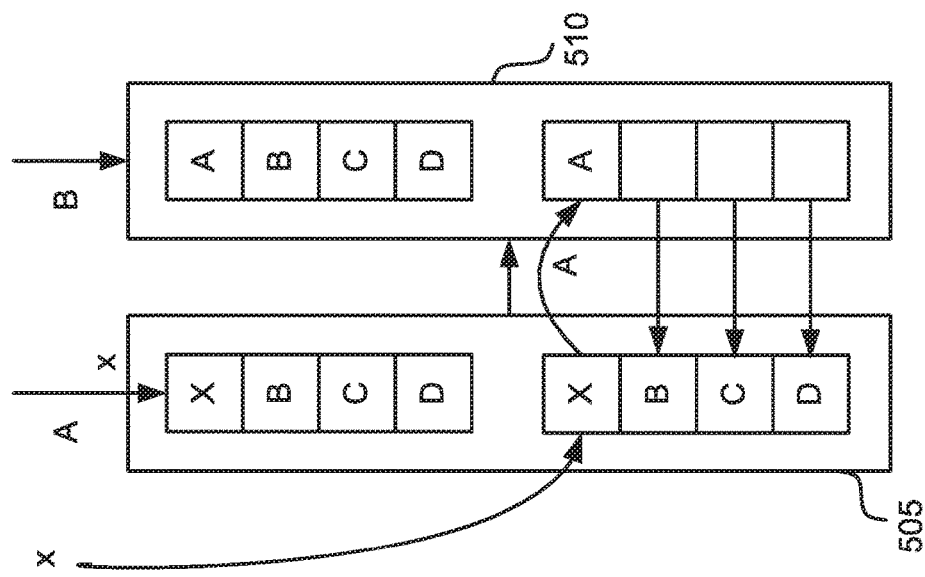
FIG. 5a-FIG. 5d depict a method to recover from a corruption, in accordance with one embodiment of the present invention.
Figure 5A:
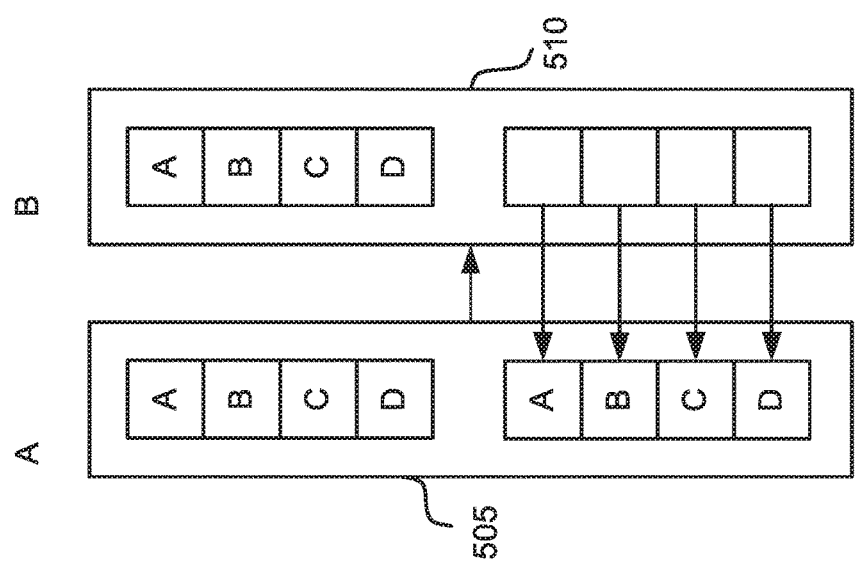

FIG. 5a depicts a source disk A 505, and snapshot copy target disk B 510, each having four grains of data. As in FIG. 4, the upper four grains of each disk 505 and 510 depict the data as presented to a host, and the lower four grains of each disk 505 and 510 depict the data as actually on the physical disk. FIG. 5a depicts the situation immediately after the disk B 510 snapshot has been made. Disk B 510 presents data (A, B, C, D) to a host, but refers to disk A 505 for the actual physical contents.

FIG. 5b depicts a state when a host writes X to a first grain of source disk A 505. Using the copy-on-write algorithm, the storage controller 108 copies the contents A of the first grain of source disk A 505 to the first grain of target disk B 510. Next, the first grain of source disk A 505 is overwritten with data X. Disk A 505 presents data (X, B, C, D) to a host. Disk B 510 presents data (A, B, C, D) to a host, but Disk B 510 refers to disk A 505 for the actual physical contents of the 2nd, 3rd and 4th grains.

Figure 5D:
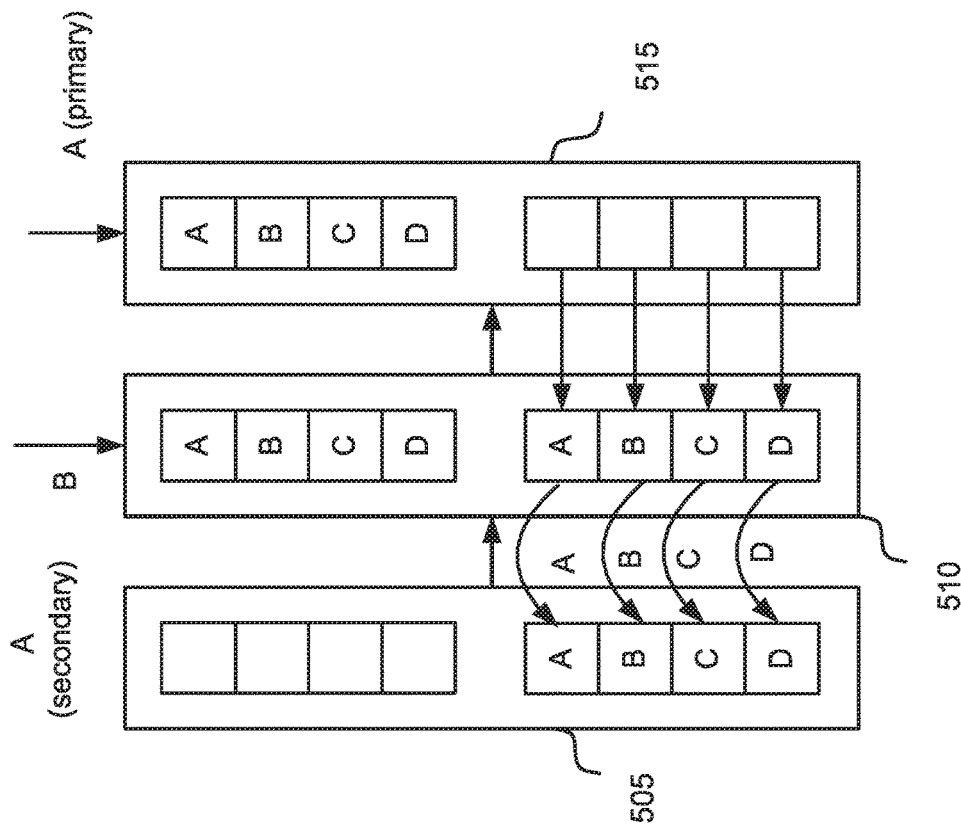
Figure 5C:
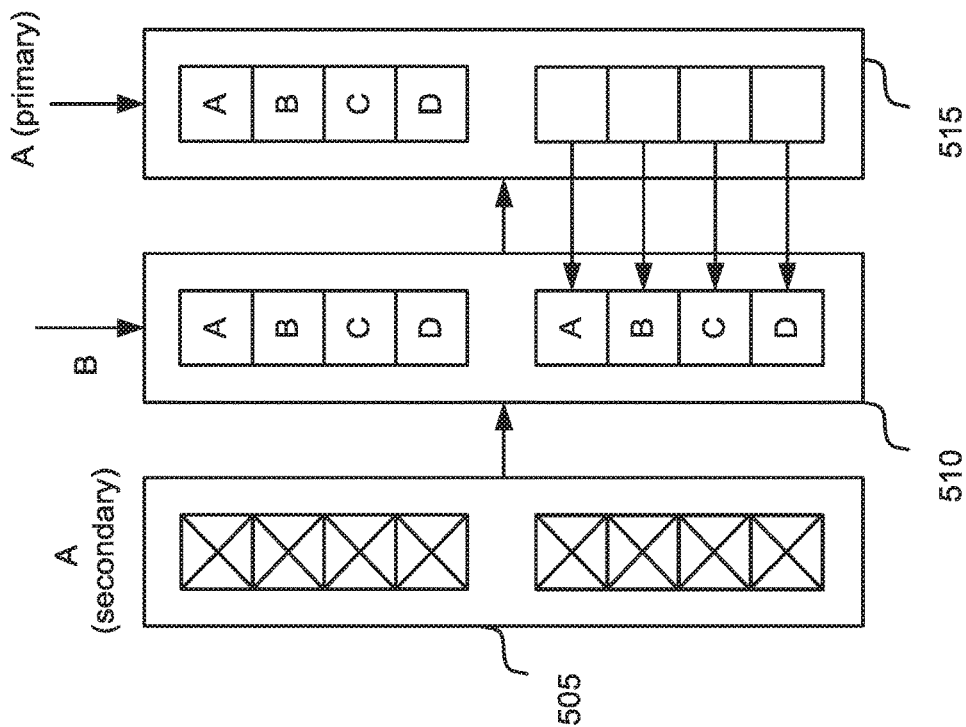

FIG. 5c depicts a state when a corruption is identified in disk A 505. Previous writes to the grains of disk A 505 have resulted in copy-on-write operations to populate the grains of disk B 510 with (A, B, C, D). The storage controller 108 initiates a recovery of source disk 505 from the snapshot copy target disk B 510. A logical source disk A (primary) 515 is inserted into the mapping as depicted in FIG. 5c, as a snapshot of target disk B 510. Logical source disk A (primary) 515 is available immediately as source disk A to a host. Logical source disk A (primary) 515 is designated "primary" to signify that a host will direct I/O operations to it. Source disk A (secondary) 505 is designated "secondary" to signify that host I/O operations are not directed at it. Disk A (primary) 515 presents data A, B, C, D to a host, but refers to disk B 510 for the actual physical contents. FIG. 5c and FIG. 5d depict logical constructions, but in reality, the physical contents of Disk A (secondary) 505 and Disk A (primary) 515 represent the same physical device.

FIG. 5d depicts the operation to recover Disk A 505 and 515. The grains on Disk B 510 are copied back to the respective grains on Disk A 505 and 515. Disk A 515 is now deleted from the mapping, so that the state reverts to that of FIG. 5a. Host I/O operations to Disk A are directed at Disk A 505.

Figure 6A:
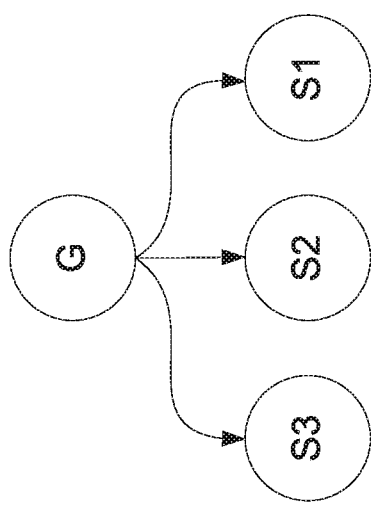
FIG. 6a-FIG. 6c depict a source disk with point-in-time copies and mappings used in recovery of the source disk, in accordance with one embodiment of the present invention.
Figure 6B:
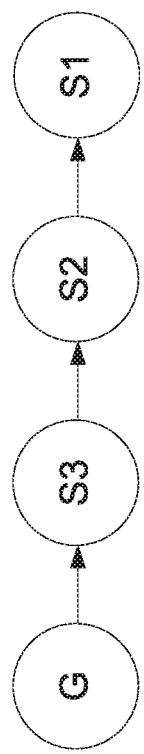
Figure 6C:
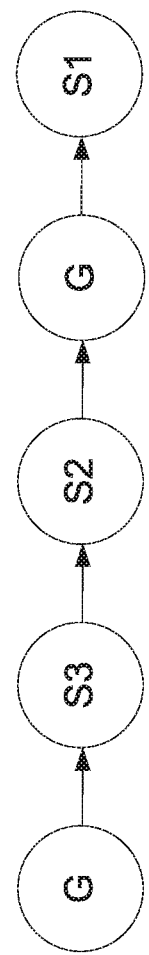

FIG. 6a-6c depict a source disk G with point-in-time copies, and mappings used in recovery of source disk G, in accordance with one embodiment of the present invention.

FIG. 6a depicts source disk G, with point-in-time copies S1, S2 and S3, taken in order S1, S2, S3. This is depicted in dependency chain graph of FIG. 6b. If source volume G is corrupted in some way by host I/O operations, restoration is made from either S3, S2, or S1. S3 is the most recent point-in-time copy, but it may not be known when the corruption occurred and if the corruption exists on one of the point-in-time copies. Mounting one of the point-in-time copies to the host system in order to test out the copy can be a very expensive task. Alternatively, restoration of source volume G can be made then tested using the existing host maps. This will be the natural method because the original host system is already set up to use the source volume G.

FIG. 6c depicts a dependency chain with restoration from S2. As in the example of FIG. 5a-FIG. 5d, the two source volumes G are in fact the same physical volume, but the host system will only see the new incarnation inserted after S2. The restore will start being performed in the background while the user carries on using the two source volumes G as though they had already been restored. The time it takes for the restoration process to be completed depends on the amount of changes that need to be restored and the rate at which the data can be moved. For example, if source disk G is a 1 TB vdisk of which 50% needs to be restored and the system can cope with a rate of 100 MB/s the restore process will take around 1.45 hours. However, suppose the user takes snapshots every hour to limit the data loss in case of data corruption. Then, a new snapshot will be taken during restoration from S2. S1 is the oldest snapshot so suppose that is recycled. This will lead to the same dependency chain but data written to source volume G by the host since the restore began is needed by S1. If source volume G is again corrupted by the host, the customer will restore from S1 or S2 depending precisely on when this corruption occurred.

Having now described operation of FlashCopy® and related services in the context of paired source and target volumes, either as a single pair or in a cascade of multiple pairs, we now describe a specific implementation of garbage collection according to the present disclosure.

Figure 7:
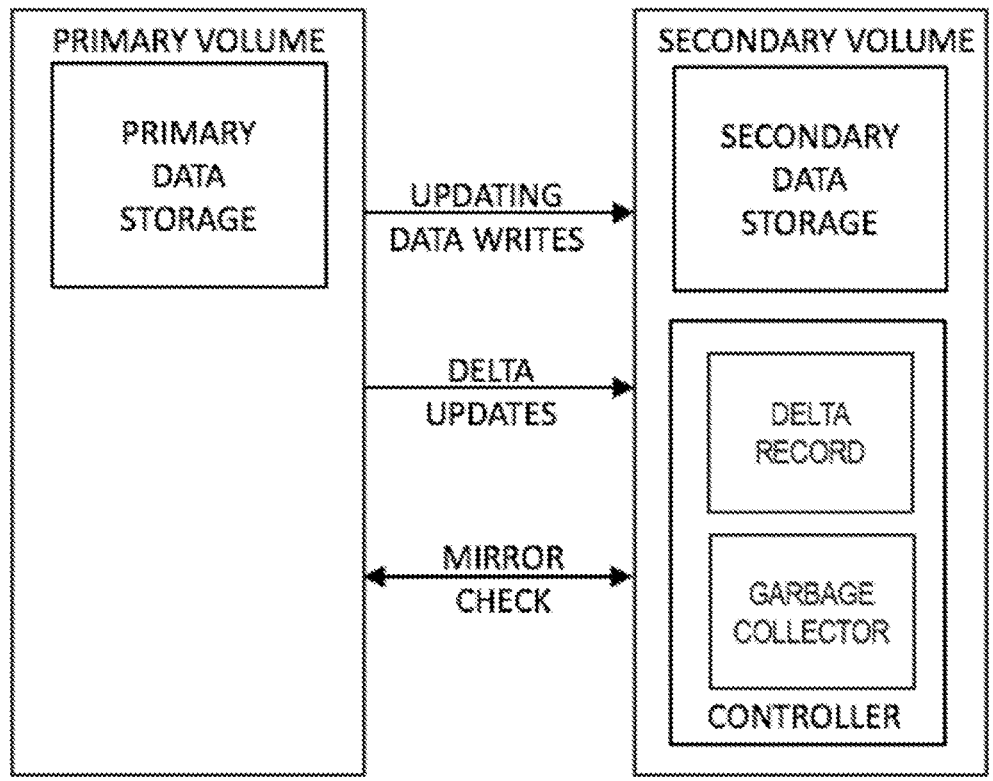
FIG. 7 is an overview system diagram showing an example primary volume and secondary volume, in accordance with one embodiment of the present invention.

FIG. 7 is an overview system diagram showing an example primary volume and secondary volume, in accordance with one embodiment of the present invention. The storage system comprises a primary volume on which primary data is stored in primary data storage and a secondary volume on which secondary data is stored in a secondary data storage. A storage controller is provided, which in FIG. 7 is shown accommodated in the secondary volume, but the storage controller can be accommodated in the primary volume or another location. The role of the storage controller which we are particularly concerned with in the present disclosure is to maintain synchronization between the primary and secondary data. The primary and secondary data storage have respective address spaces divided into address blocks, each comprising a range of addresses. The storage controller is responsible for maintaining and storing an incremental record of current differences between the primary and secondary volumes on a per address block basis, which is labelled as a delta record in FIG. 7. The delta record effectively keeps track of imminent writes from the primary volume, that is writes which are predicted, but which have not yet been transmitted to the secondary volume.

The storage controller is also responsible for operating a garbage collection algorithm, labelled garbage collector in FIG. 7. The garbage collection cleans up the address space in the secondary data storage by identifying address blocks storing no-longer-current secondary data and noting those address blocks as available for writes. In operation, the garbage collection algorithm refers to the incremental record to find the imminent writes to the secondary volume.

The principal data exchanges between the primary and secondary volumes in respect of mirroring activity are shown by arrows in FIG. 7. These are as follows. Firstly, there is transmission of updating data writes from the primary to the secondary volume so that the secondary data storage is updated. This will be a continual process. Secondly, there is transmission of updates from the primary to the secondary volume of updates in respect of the incremental "delta" record of differences between the primary and secondary volumes. Thirdly, there is data exchange so that from time-to-time a full mirror can be sensed between the primary and secondary volumes indicating that there is complete consistency between the primary and secondary data storages, in which case the delta record will be initialized to a null state. This is labelled mirror check in FIG. 7. Complete mirroring can be regarded as a starting condition for the subsequent operation according to the present disclosure. That is, the delta record and updating writes are at an particular moment in time referenced to changes to the primary data that have occurred since the most recent start condition.

Figure 8:
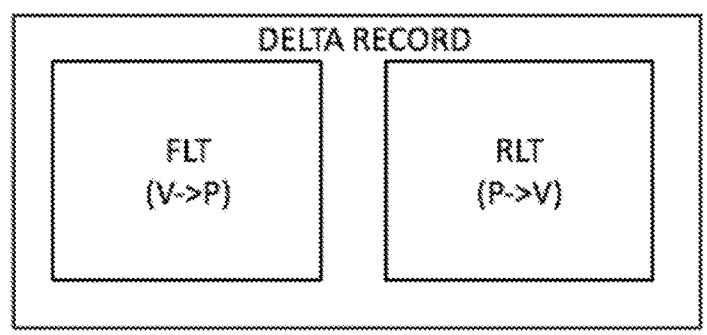
FIG. 8 shows a part of the system diagram of FIG. 7 in more detail, in accordance with one embodiment of the present invention.

FIG. 8 shows the delta record of FIG. 7 in more detail to show that it comprises both forward and reverse lookup tables (FLT and RLT), in accordance with one embodiment of the present invention. A FLT describes the virtual-to-physical mapping, whereas a RLT describes the physical-to-virtual mapping. Although both FLT and RLT are illustrated as being stored in the delta record in the secondary volume, it may be that they are stored and maintained at different locations. For example, the FLT can be stored in the primary volume and the RLT in the secondary volume. As described in detail below, the FLT is used by the primary volume for read operations, whereas the RLT is used by the garbage collection to identify stale, i.e. out-of-date areas of the secondary storage.

Figure 9:
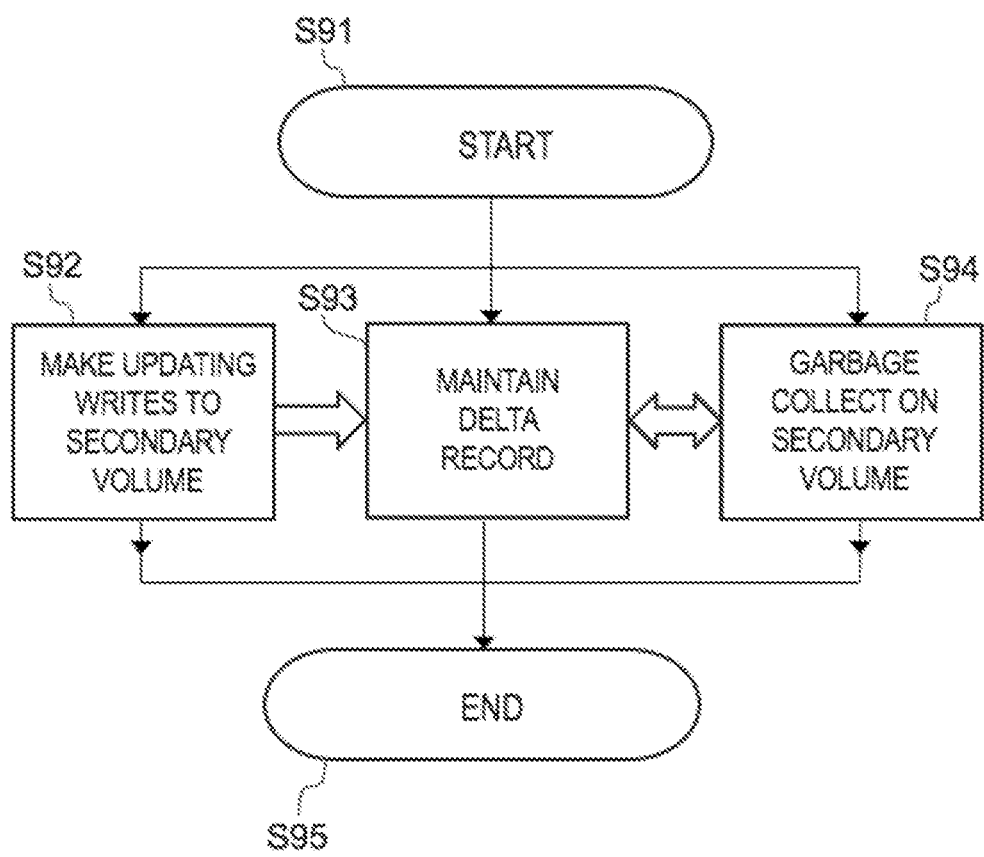
FIG. 9 shows process flow according to the system of FIG. 7, in accordance with one embodiment of the present invention.

FIG. 9 shows process flow according to the system of FIG. 7, in accordance with one embodiment of the present invention. The process starts at Step S91 which is whenever the system senses a start condition in which the secondary data has been checked as being a mirror of the primary data, so this start condition will recur from time to time during normal operation. After start, three operations run in parallel as now described.

Step S92 shows the action of writes being transmitted from the primary to secondary volume, the writes being of primary data which has changed since the start condition.

Step S93 shows the operation of maintaining an incremental, "delta" record of current differences between the primary and secondary volumes on a per address block basis to keep track of imminent writes from the primary volume which have not yet been transmitted to the secondary volume.

Step S94 show the operation of garbage collection on the secondary volume to clean up the address space by identifying address blocks storing no-longer-current secondary data and noting those address blocks as available for writes, wherein the garbage collection algorithm refers to the incremental record to find the imminent writes to the secondary volume.

The updates that are written in Step S92 cause changes to the incremental, "delta" record maintained in Step S93 as indicated by the broad, single-headed arrow in FIG. 9. Moreover, garbage collection and maintenance of the incremental record in Steps S93 and S94 interact as indicated by the broad, double-headed arrow in FIG. 9.

The process can terminate whenever desired or necessary as shown in Step S95.

As described, an incremental record in the form of an incremental bitmap is used in FlashCopy® and related services. The incremental bitmap can be used to inform the controller responsible for garbage collection on the target volume, which may be at a remote site or co-located with the source volume, that there are likely to be a bunch of overwrites to the address ranges on the target volume pointed to by the address blocks referred to in the incremental bitmap. This information can be used by the garbage collection engines to warn the garbage collection algorithm to prioritize these areas for garbage collection. A technical benefit here is that the garbage collector's scheduler can group together all the areas of the bitmap to form a plan of much larger areas of the physical storage to perform garbage collection on.

For example, a number of different writes may have occurred at different times, but these all contribute to a "run sequence" of set bits on the change tracking bitmap in the source site. The garbage collection algorithm can exploit knowledge of how large a contiguous area is going to be garbage collected before it has received the data writes that are going to invalidate the old data and as, in GMCV, the target volume is already in a temporarily inconsistent state during catch up, optimizations are permissible even if these temporarily result in volume inconsistencies.

An extension of the proposed strategy can be applied when two of more such sets of writes are almost contiguous, but separated by a small number of grains that have not been written to. For example the bitmap for the grains may have a sequence that looks like:
 . . . 1, 1, 1, 1, 1, 1, 1, 1, 1, 1, 1, 1, 1, 1, 1, 1, 1, 1, 0, 1, 1, 1, 1, 1, 1, 1, 1, 1, 1, 1, 1, 1, 1, 1 . . . .

In such case, there are optimizations that are possible if the grain that has not been written to is treated as is if it has—thus allowing the unification of the two larger contiguous data areas that are being written to in this global mirror change volume change set. As the grain marked as a zero has not changed, it does not have to be needlessly transmitted but its physical relocation on the remote site allows a potentially large, less fragmented area to be garbage collected and freed up—as the earlier I/O sequence that originally is the source of the data at the grain that is marked with the zero, and thus not updated in this change set, is likely to have spanned multiple grains and all these other, potentially co-located, neighboring grains are becoming collectable.

In certain embodiments, we use an exemplary formula to calculate whether the proposed optimization is advantageous, and then only perform the optimization when the result of the formula indicates it will be advantageous. The formula is based on: the fixed cost of each separate I/O, the cost that is variable in each I/O in relation to the size of the I/O's data, the length of the sequence of unwritten data (0's), and the length of the neighboring written areas (1's). The method simply calculates the costs (model) for each of: (A) The two (or more) sequences are coalesced. (B) The two (or more) sequence are not coalesced.

The method then chooses to perform the operation that is least costly, and then moves on to the "next" sequence of 1's in the bitmap and applies the formula once more.

There is a cut-off for not applying the method if the run-length of the 1's not above or below a set length or if the run-length of the number of 0's is above or below a set length. For example, in a sparsely populated bitmap or a bitmap where there are lots of 1's and 0's such as 010010010111100110101001010010101, it may be that the cost of the 1's means that it is not advantageous to apply the proposed method. Another example is a bitmap where there are hardly any 1's which also means that there will be no advantage in applying the proposed method. The formula for determining whether applying the proposed method provides a benefit is applied over a set of I/O's that contains an address range that spans the desired garbage collection work unit size as this is the maximum potential set of address contiguous I/O's that will ever be coalesced at the remote site.

If the system performed I/O operations without the proposed method, the system will perform garbage collection I/O reactively while the system is executing updating writes to the secondary volume, i.e., as each update segment is copied to the target. Potentially, depending on the workload, this will perform much smaller I/O operations and much less efficient garbage collection. On the other hand, by applying the proposed method, we are exploiting advance knowledge of what is almost certainly about to get written to the secondary volume, so that the system can plan in advance the areas of the secondary storage medium that need to be cleaned up with a garbage collection. The garbage collection will then be much more efficient, saving I/O operations and drive spindle cycles, and allowing much larger, sequential I/O's to take place instead of smaller, random I/O's. Additionally, if the target volume controller can see, with reference to the incremental bitmap, that there is already sufficient space available for the predicted forthcoming writes, then garbage collection can be temporarily disabled. Furthermore, the remote site can use the foreknowledge of imminent updating writes to defer de-fragmentation actions in respect of still-valid address blocks in cases where the incremental bitmap indicates that the corresponding address blocks on the source volume have recently been overwritten, so will become invalid shortly also on the target volume.

We now describe a specific implementation by way of example only.

In the following we refer to sectors of storage. Sectors are the units into which a disk drive is divided into. Depending on how the drive is formatted, there are typically 512 bytes per sector, or more recently 4096 bytes per sector. Other known formats are 520 or 524 bytes per sector, where the extra bytes over 512 are used to make a cyclical redundancy check (CRC) for the data in that sector. Read or write operations to the drive can only be issued with one sector granularity, e.g., for 512 sectors that may be 512, 1024, 1536, 2048 bytes, etc. However, the Small Computer System Interface (SCSI) standards specification permits arbitrary sector size, so the above should only be interpreted as common examples. Ultimately sector size will be chosen in any particular implementation according to the overall formatted size of the storage volume. For example, if the formatted size is 512 bytes per sector, an I/O request of "1" is assumed to return 512 bytes of data.

In the following we also refer to the previously mentioned forward and reverse lookup tables (FLT and RLT). The FLT is used when the host reads an LBA, to get the most current form of the data. The RLT is used by garbage collection to identify the stale areas of the virtual address space. Overwrites to virtual addresses are not overwritten one-to-one in the same locations on the physical space, therefore the FLT of virtual-to-physical mappings is updated to reflect the new location. The physical space will therefore, at least from time to time, contain old-copies of the virtual address data, especially if the same virtual address is overwritten frequently. This means that, if there is a reference in the RLT that maps a physical-to-virtual location that is not in the FLT, it can be inferred that the RLT entry is a stale reference on the physical media. Without a RLT, a manual scan of the physical space will be needed in combination with lookup in the FLT which will be very costly.

In the following we note the bits in the bitmap index may refer to grains, i.e. be grain identifiers (grainld's), or may refer to logical block address (LBA) units, since an LBA is a fixed function of grainld and all write data is in units of grains, i.e. an integer number of grains. At the point the trigger is requested, a bitmap scan occurs of bitmap B.

The garbage collection engine of the copy target or the remote site is requested to specify its desired garbage collection unit: e.g. 100 MB or 1 GB. This is the desired memory size into which fragmented data should be coalesced. Let us call the garbage collection unit X. The desired size is also the desired alignment for the garbage collection. The alignment is used to minimize lock contention, which is the prevalence of locking of contiguous storage areas to enable read/write operations, wherein only one read/write operation is permitted to access a locked storage area at any one time, i.e. the access to the locked area is serialized. Alignment refers to the desire to have a good mapping between the data accessed by the read/write operations and the boundaries defined for the storage areas, so that any given read/write operation does not need to access a higher number of storage areas than necessary having regard to the amount of data involved.

Suppose the current LBA=C. The garbage collection will then start from LBA C=0. The bitmap scan uses the size/alignment X on a per sector basis with the aim of building the largest possible garbage collection bitmap of contiguous sectors that have changed since the previous trigger, up to a maximum size of the desired garbage collection unit X.

Let us called the garbage collection bitmap that is thus created as G.

The point where the scan of bitmap B becomes non-contiguous, indicates where we got to last which we refer to in the following as "L".

If the system determines that the run length of the contiguous written LBAs makes this optimization worth applying then bitmap G is transmitted from the source volume (at the host site) to the target volume (at a remote site) prior to the data associated with the bitmap G being transmitted from the source volume to the target volume. The bitmap is in the form of a set of {LBA, {0||1}, runLength} tuples, where the tuple has a "1" in the area indicated by {0|1}. The remote site sources the data from the GMCV flow which is about to arrive, where the tuple has a 0 in the area indicated by {0|1}. This represents an area that can be read and relocated at the remote copy site in order to coalesce two areas of garbage collection. The remote site now has prior warning of how contiguous the next sequence of writes are going to be, and can optimize its operations using this information.

The garbage collection engine is now aware that it is about to receive a bunch of overwrites with addresses upwards from LBA C with addresses specified by the bits of bitmap G. The garbage collection engine handles this knowledge contained within bitmap G through the following mechanism.

The reverse lookup table (RLT) is updated with information designating the soon-to-be freed grains, i.e., the ones about to be the subject of overwrites from an update to sync the target volume with recent changes to the source volume.

For a given garbage collection region, R, where the predicted overwrites are predicted to occur, we perform the following.

For each region R we calculate two scores: "Score_A" and "Score_B". "Score_A" is the cost of garbage collection, ignoring the soon-to-be-freed grains. "Score_A" is calculated as cost_to_relocate(R.live_data). This corresponds to the conventional cost of garbage collection. "Score_B" is the cost of garbage collection, taking account of the soon-to-be-freed grains. This score is calculated as: score A—cost_to_relocate(freed_region). We also calculate a time T which is the amount of time expected to complete the I/O.

The garbage collection engine has a scheduler which then makes use of these scores to determine how best to proceed.

The scheduler will calculate E, the expected space use before T. The underlying aim is to determine if the amount of space that will be freed by garbage collecting a particular area will be of overall benefit or not. For example, if the predicted number and frequency of new host application writes to the target volume means that space usage on the target is likely to increase, it is unlikely that running the garbage collection operation will provide a benefit, because overall in the next time window the amount of space that will be used will not be decreasing, but rather increasing. The calculation of E by the scheduler is performed making use of historical I/O patterns and the additional information from the bitmap. The more soon-to-be freed grains specified in the RLT entry for that region, the more I/O will be performed as a consequence. Here it is noted that an RLT entry is specific to a region and includes a bitmap of the space in that region that is valid.

If the available storage on the target volume exceeds the amount of storage, E, that we predict will be consumed before time T in the course of making the update represented by bitmap G then we proceed in the following fashion: (a) Add garbage collection region R to a heap of regions, H, using "Score B" as the determinant of heap location. Lower scores are processed first. (b) Process the heap of regions H, picking candidate garbage collection regions off the heap and adding them to a scheduling queue. Process as many regions as is required to meet space requirements for I/O in the scheduling window (up-to T). (c) If garbage collection region R is processed, do not attempt to relocate sectors within region R that relate to grains designated for overwrites in the bitmap G such as a FlashCopy® bitmap or a GMCV. (d) When the GMCV I/O occurs, the RLT will be updated. Once the last update has been completed, garbage collection region R will be completely empty and so is ready for reuse immediately, i.e. to accept overwrites from I/O actions.

On the other hand, if the available storage on the target volume is less the amount of storage, E, that we predict will be consumed before time T in the course of making the update represented by bitmap G then we proceed in the following fashion: (a) Add garbage collection region R to a heap of regions, H, using Score_A as the determinant of heap location. Lower scores are processed first. (b) Process the heap of regions H, picking candidate garbage collection regions off the heap and adding them to a scheduling queue. Process as many regions as is required to meet space requirements for I/O in the scheduling window (up-to T). (c) When the garbage collection region R is processed, relocate all sectors within region R that relate to live data, including any sectors which are designated for overwrites in the GMCV. (d) Mark those relocated GMCV sectors when performing I/O, so that when a future garbage collection schedule is made, we can make use of the GMCV information available to prioritize clean-up of these sectors. (e) Once the garbage collection has relocated all the live data that is in region R, region R is ready for re-use, i.e., to accept overwrites from I/O actions.

If region R is subject to garbage collection & GMCV I/O, the region will have been cleared and then reused. If region R is not subject to garbage collection, the GMCV I/O will unmark the RLT for the designated regions eventually, where the designated regions are regions in whose grains no longer are storing live data, so are clean-up candidates.

A possible cost function for garbage collection for a given region can be the following:

$$\text{cost\_to\_relocate}(R) = \text{rlt\_update\_cost}(R) + \text{live\_data}(R) + \text{forward\_lookup\_update\_cost}(R)$$

This can be calculated by inspecting the RLT for region R.

The above two modes have the aim of minimizing I/O spent on garbage collection in the immediate timeframe when I/O bandwidth is demanded for user I/O to update the target volume, so as not to slow or stall updating writes to the target volume. If the target volume is close to an out-of-space condition, the Score_A mode is used, which selects the "easiest" regions for garbage collection and re-use, where "easiest" means lowest cost for moving the data, i.e. move the most data in the least time. This strategy is followed even if it will be a better longer-term optimization to wait for the region to be coalesced with a defragmenting clean up. The Score_A mode is in effect a "panic" mode, which, if not included, results in it not being possible to perform the user I/O for want of space. In any case, the system should perform sufficient garbage collection on an ongoing basis such that the Score_B option is available for use most of the time.

The cost of the above approach is that we must mark the RLT in advance, and calculate two scores, but this is a relatively cheap action and of linear cost against the size of the garbage collection unit X. The benefit is that we do not perform garbage collection on regions which are predicted to become invalid, which potentially will save significantly on the amount of I/O consumed by garbage collection. The approach should also result in less fragmentation of the physical domain, since we avoid relocating live data grains which are about to become dead, i.e., invalid. With a conventional approach, a coalescing action includes coalescing grains which are about to become invalid in the course of updating writes from the source volume, so that almost immediately after a coalesced region is formed, it will become fragmented.

The garbage collection engine then uses LBA C for the forward lookup table (FLT) to get to the physical location. This can then be used to look up the RLT, so that we immediately have the reverse lookup location, rather than scanning the RLT for data to be scavenged, i.e., garbage collected and coalesced.

Handling contiguous LBAs is advantageous for garbage collection as it results in optimal space reclamation, assuming a friendly workload. If a workload on a thin-provisioned volume is vaguely sequential, being able to free a sequential (virtual) region should result in a significant physical domain being recovered as opposed to a relatively fragmented one. It is also advantageous, even if the physical domain is fragmented, that the virtual-domain lookup should be sequential resulting in optimal update behavior.

The scan of bitmap B now continues from LBA L, i.e. C is set to L. The next bunch of bits in the bitmap B is then sought to coalesce.

The exact format of the bitmap sent is just an example, any correct format that conveys the information would enable the invention to operate in the remote site to the same effect. Similarly, while GMCV is an optimal example of where we have advance knowledge of incoming I/O streams of the data that is being replicated from source to target, we can devise similar scenarios with other technologies, for example a large collection of thin-provisioned volumes being synced in sequence during an initial RemoteCopy sync.

Figure 10:
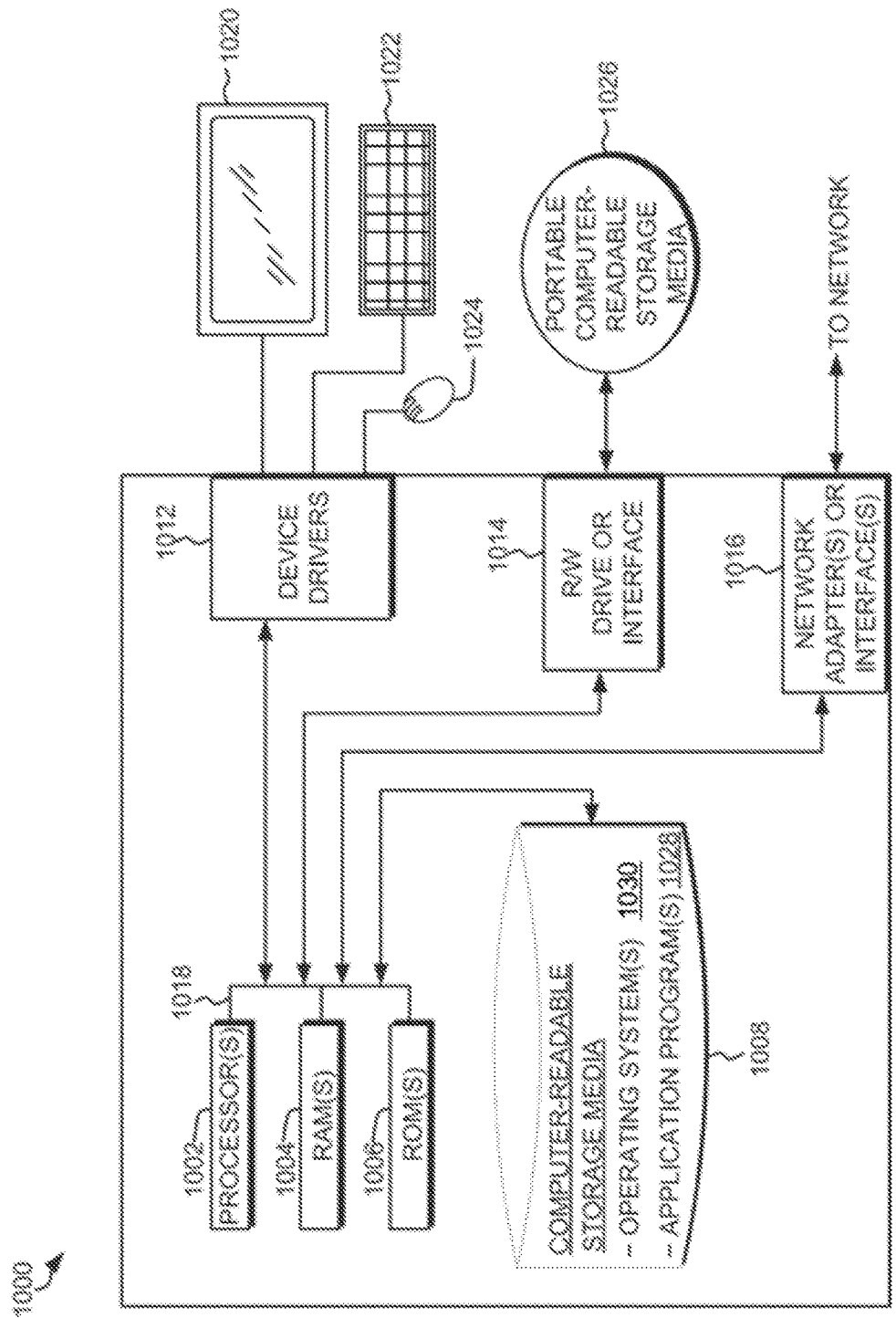
FIG. 10 depicts a block diagram of components of a computing device capable of performing computing operations, in accordance with one embodiment of the present invention.

FIG. 10 depicts a block diagram of components of a computing device 1000 capable of performing the computing operations described herein, in accordance with one embodiment of the present invention. It should be appreciated that FIG. 10 provides only an illustration of one implementation and does not imply any limitations with regard to the environments in which different embodiments may be implemented. Many modifications to the depicted environment may be made.

Computing device 1000 may include one or more processors 1002, one or more computer-readable RAMs 1004, one or more computer-readable ROMs 1006, one or more computer readable storage media 1008, device drivers 1012, read/write drive or interface 1014, network adapter or interface 1016, all interconnected over a communications fabric 1018. Communications fabric 1018 may be implemented with any architecture designed for passing data and/or control information between processors (such as microprocessors, communications and network processors, etc.), system memory, peripheral devices, and any other hardware components within a system.

One or more operating systems 1030, and one or more application programs 1028, are stored on one or more of the computer readable storage media 1008 for execution by one or more of the processors 1002 via one or more of the respective RAMs 1004 (which typically include cache memory). In the illustrated embodiment, each of the computer readable storage media 1008 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 1000 may also include a R/W drive or interface 1014 to read from and write to one or more portable computer readable storage media 1026. Application programs 1028 on client computing devices and/or computing device 1000 may be stored on one or more of the portable computer readable storage media 1026, read via the respective R/W drive or interface 1014 and loaded into the respective computer readable storage media 1008.

Computing device 1000 may also include a network adapter or interface 1016, such as a TCP/IP adapter card or wireless communication adapter (such as a 4G wireless communication adapter using OFDMA technology). Application programs 1028 on computing device 1000 may be downloaded to the computing device from an external computer or external storage device via a network (for example, the Internet, a local area network or other wide area network or wireless network) and network adapter or interface 1016. From the network adapter or interface 1016, the programs may be loaded onto computer readable storage media 1008. The network may comprise copper wires, optical fibers, wireless transmission, routers, firewalls, switches, gateway computers and/or edge servers.

Computing device 1000 may also include a display screen 1020, a keyboard or keypad 1022, and a computer mouse or touchpad 1024. Device drivers 1012 interface to display screen 1020 for imaging, to keyboard or keypad 1022, to computer mouse or touchpad 1024, and/or to display screen 1020 for pressure sensing of alphanumeric character entry and user selections. The device drivers 1012, R/W drive or interface 1014 and network adapter or interface 1016 may comprise hardware and software (stored on computer readable storage media 1008 and/or ROM 1006).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
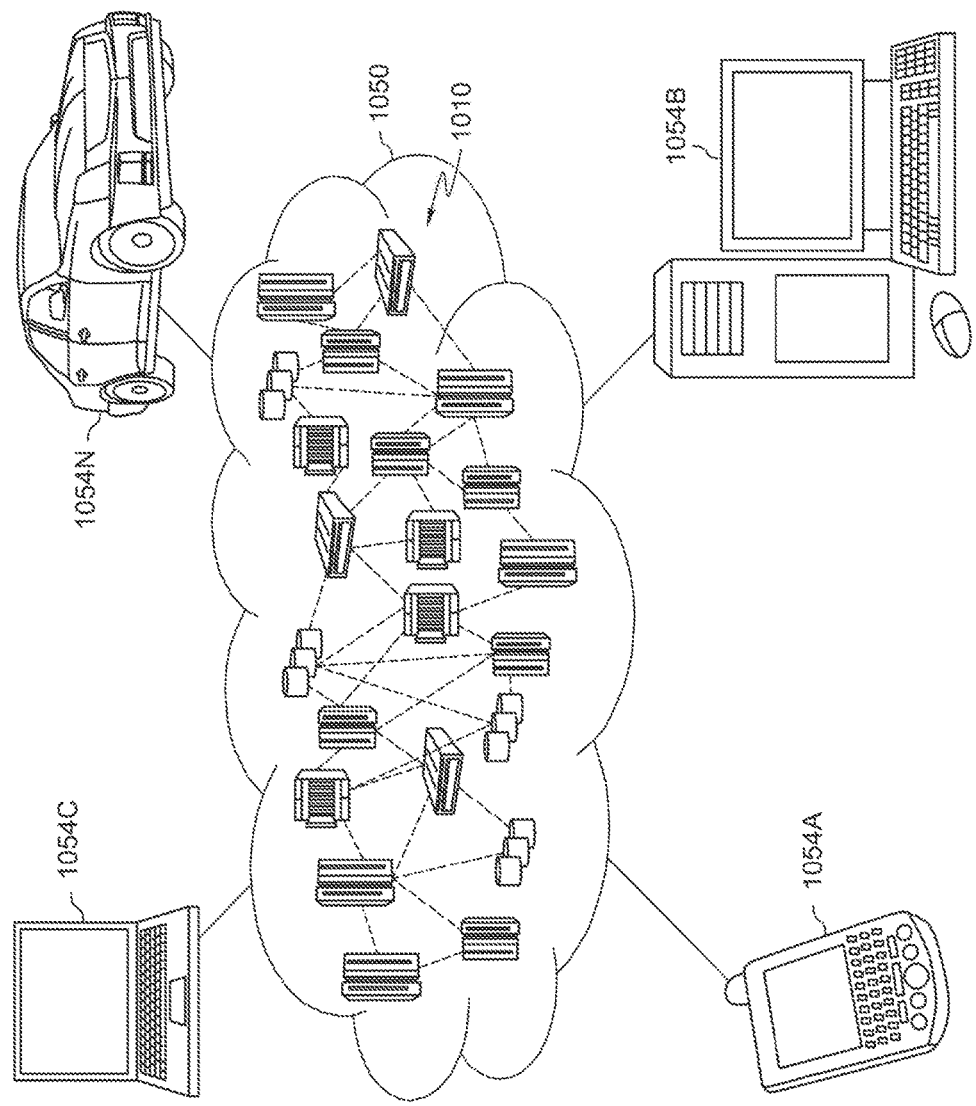
FIG. 11 depicts a cloud computing environment, in accordance with one embodiment of the present invention.

Referring now to FIG. 11, illustrative cloud computing environment 1050 is depicted. As shown, cloud computing environment 1050 comprises one or more cloud computing nodes 1010 with which local computing devices used by cloud consumers; for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 11 are intended to be illustrative only and that computing nodes 1010 and cloud computing environment 1050 can communicate with any type of computerized device over any type of network and/or network addressable connection (e.g., using a web browser).

Figure 12:
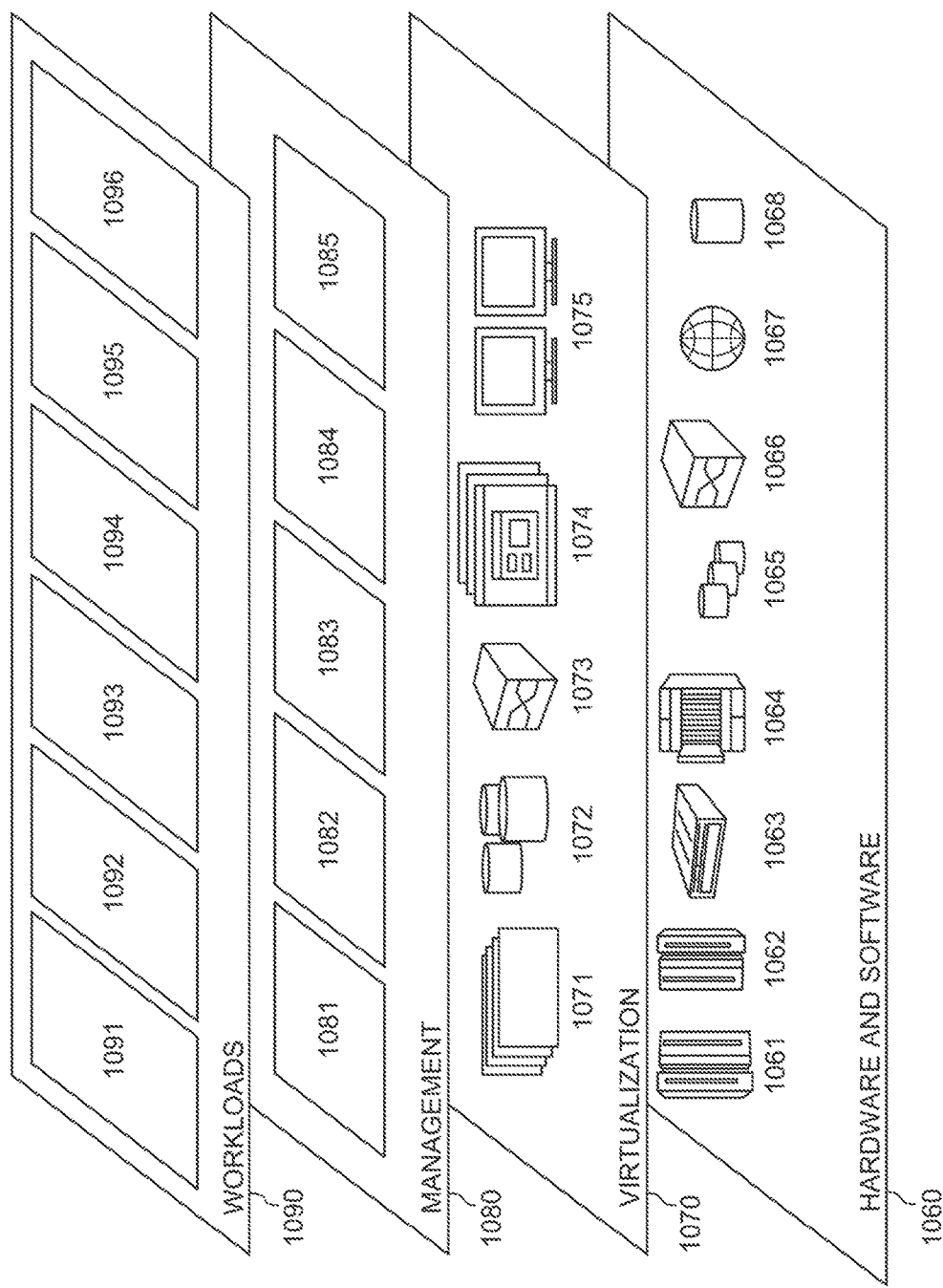
FIG. 12 depicts abstraction model layers in a cloud infrastructure environment, in accordance with one embodiment of the present invention.

Referring now to FIG. 12, a set of functional abstraction layers provided by cloud computing environment 1050 (FIG. 11) is shown. It should be understood in advance that the components, layers, and functions shown in FIG. 12 are intended to be illustrative only and embodiments of the invention are not limited thereto. As depicted, the following layers and corresponding functions are provided.

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; and transaction processing 1095.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

The present invention may be an apparatus, a method, and/or a computer program product. The computer program product may include a computer readable storage medium (or media) having computer readable program instructions thereon for causing a processor to carry out aspects of the present invention.

It will be clear to one skilled in the art that many improvements and modifications can be made to the foregoing exemplary embodiment without departing from the scope of the present disclosure.

What is claimed is:

1. A method for maintaining synchronization between primary data stored in a primary volume and secondary data stored in a secondary volume, the primary volume and the secondary volume having respective address spaces divided into address blocks, each comprising a range of addresses, the method comprising:
   determining a start condition in which the secondary data has been checked as being a mirror of the primary data;
   transmitting writes of the primary data that have occurred since the start condition to the secondary volume;
   maintaining an incremental record of current differences between the primary and secondary volumes on a per address block basis to keep track of imminent writes from the primary volume which have not yet been transmitted to the secondary volume;
   operating a garbage collection algorithm on the secondary volume to clean up an address space by identifying address blocks storing no-longer-current secondary data and noting the address blocks as available for writes, wherein the garbage collection algorithm refers to the incremental record to find the imminent writes to the secondary volume;
   wherein the garbage collection algorithm is further operable to clean up the secondary volume by moving current address blocks to reduce fragmentation;
   wherein the garbage collection algorithm, when selecting the address blocks for moving, identifies at least first sequence and second sequence of the contiguous sequences of address blocks and selects the at least first sequence and second sequence for moving together when the at least first sequence and second sequence are separated only by a small gap in the address space;
   and wherein the small gap is a gap of a number of address blocks, wherein the number of address blocks is less than 10% of a total number of the address blocks in the at least first sequence and second sequence.

2. The method of claim 1, wherein the garbage collection algorithm refers to the incremental record in decision making on which regions of an address space of the secondary volume to select for clean-up.

3. The method of claim 1, wherein the garbage collection algorithm refers to the incremental record when selecting which of the current address blocks to move, for which the incremental record indicates corresponding address blocks on the primary volume are different.

4. The method of claim 1, wherein the garbage collection algorithm, when identifying the contiguous sequences of address blocks, refers to the incremental record to identify contiguous sequences of address blocks which have been changed on the primary volume and not yet replicated on the secondary volume.

5. The method of claim 1, wherein the garbage collection algorithm refers to the incremental record to assess what regions of address space will be required on the secondary volume by the imminent writes, and temporarily suspends its garbage collection operations conditional on the secondary volume currently having sufficient available address space to accommodate the imminent writes.

6. The method of claim 1, wherein the garbage collection algorithm is configured to operate based on physical addresses of the secondary volume.

7. The method of claim 1, wherein at least one of the primary and secondary volumes operates on virtualized addresses, and a lookup record is maintained to map physical to virtual addresses on a per address block basis.

8. A computer system for maintaining synchronization between primary data stored in a primary volume and secondary data stored in a secondary volume, the primary volume and the secondary volume having respective address spaces divided into address blocks, each comprising a range of addresses, the computer system comprising:
   one or more processors, one or more computer readable tangible storage devices, and program instructions stored on at least one of the one or more computer readable tangible storage devices for execution by at least one of the one or more processors, the program instructions executable to:
   determine a start condition in which the secondary data has been checked as being a mirror of the primary data;

transmit writes of the primary data that have occurred since the start condition to the secondary volume;

maintain an incremental record of current differences between the primary and secondary volumes on a per address block basis to keep track of imminent writes from the primary volume which have not yet been transmitted to the secondary volume;

operate a garbage collection algorithm on the secondary volume to clean up an address space by identifying address blocks storing no-longer-current secondary data and noting the address blocks as available for writes, wherein the garbage collection algorithm refers to the incremental record to find the imminent writes to the secondary volume;

wherein the garbage collection algorithm is further operable to clean up the secondary volume by moving current address blocks to reduce fragmentation;

wherein the garbage collection algorithm, when selecting the address blocks for moving, identifies at least first sequence and second sequence of contiguous sequences of address blocks and selects the at least first sequence and second sequence for moving together when the at least first sequence and second sequence are separated only by a small gap in the address space;

and wherein the small gap is a gap of a number of address blocks, wherein the number of address blocks is less than 10% of a total number of the address blocks in the at least first sequence and second sequence.

9. The computer system of claim 8, wherein the garbage collection algorithm refers to the incremental record in decision making on which regions of an address space of the secondary volume to select for clean-up.

10. The computer system of claim 8, wherein the garbage collection algorithm refers to the incremental record when selecting which of the current address blocks to move, for which the incremental record indicates corresponding address blocks on the primary volume are different.

11. The computer system of claim 8, wherein the garbage collection algorithm, when identifying the contiguous sequences of address blocks, refers to the incremental record to identify contiguous sequences of address blocks which have been changed on the primary volume and not yet replicated on the secondary volume.

12. The computer system of claim 8, wherein the garbage collection algorithm refers to the incremental record to assess what regions of address space will be required on the secondary volume by the imminent writes, and temporarily suspends its garbage collection operations conditional on the secondary volume currently having sufficient available address space to accommodate the imminent writes.

13. The computer system of claim 8, wherein the garbage collection algorithm is configured to operate based on physical addresses of the secondary volume.

14. The computer system of claim 8, wherein at least one of the primary and secondary volumes operates on virtualized addresses, and a lookup record is maintained to map physical to virtual addresses on a per address block basis.

\* \* \* \* \*